United States Patent
Gerrits et al.

(10) Patent No.: US 12,533,839 B2
(45) Date of Patent: Jan. 27, 2026

(54) COATED BI-DIRECTIONALLY ORIENTED MULTILAYER FILM

(71) Applicant: SABIC GLOBAL TECHNOLOGIES B.V., Bergen op Zoom (NL)

(72) Inventors: Niclasina Siberta Johanna Alberdina Gerrits, Sittard (NL); Attilio Scala, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 146 days.

(21) Appl. No.: 18/284,990

(22) PCT Filed: Apr. 1, 2022

(86) PCT No.: PCT/EP2022/058803
§ 371 (c)(1),
(2) Date: Sep. 29, 2023

(87) PCT Pub. No.: WO2022/214406
PCT Pub. Date: Oct. 13, 2022

(65) Prior Publication Data
US 2024/0173907 A1    May 30, 2024

(30) Foreign Application Priority Data
Apr. 7, 2021 (EP) .................... 21167144

(51) Int. Cl.
  *B29C 48/21* (2019.01)
  *B29C 48/00* (2019.01)
  *B29C 48/88* (2019.01)
  *B29C 48/91* (2019.01)
  *B29K 23/00* (2006.01)

(52) U.S. Cl.
  CPC .......... *B29C 48/21* (2019.02); *B29C 48/0018* (2019.02); *B29C 48/91* (2019.02); *B29C 48/911* (2019.02); *B29C 2948/92647* (2019.02); *B29C 2948/92685* (2019.02); *B29C 2948/92695* (2019.02); *B29K 2023/0625* (2013.01); *B29K 2023/065* (2013.01)

(58) Field of Classification Search
  None
  See application file for complete search history.

(56) References Cited

U.S. PATENT DOCUMENTS

| | | |
|---|---|---|
| 2017/0259541 A1 | 9/2017 | Leano et al. |
| 2018/0272672 A1 | 9/2018 | Ambroise |
| 2021/0016550 A1 | 1/2021 | Lindemann et al. |
| 2021/0086490 A1 | 3/2021 | Do Valle et al. |

FOREIGN PATENT DOCUMENTS

DE    3766689 A1 *  1/2021  ............. B05D 3/002

OTHER PUBLICATIONS

Lindemann EP3766689A1 English Translation 2021 (Year: 2021).*
International Search Report for International Application No. PCT/EP2022/058803, International Filing Date 01APR2022, Date of Mailing Jul. 15, 2022, 5 pages.
Written Opinion for International Application No. PCT/EP2022/058803, International Filing Date 01APR2022, Date of Mailing Jul. 15, 2022, 6 pages.

* cited by examiner

*Primary Examiner* — Jacob T Minskey
*Assistant Examiner* — Adrien J Bernard
(74) *Attorney, Agent, or Firm* — CANTOR COLBURN LLP

(57) ABSTRACT

A multilayer film includes an inner layer system having a first surface and a second surface; a first layer bound to the inner layer system at the first surface of the inner layer system; and a second layer comprising a first surface and a second surface, wherein the second layer is with its first surface bound to the inner layer system at the second surface of the inner layer system; a coating layer bound to the second layer at the second surface of the second layer; wherein the inner layer system consists of a polymer formulation (A) comprising: ≥10.0 and ≤90.0 wt % of a first ethylene-based polymer being LLDPE-A; and ≥10.0 and ≤90.0 wt % of HDPE having a density of ≥940 and ≤970 kg/m³; the first layer contains a polymer formulation (B) including LLDPE-A, the second layer contains a polymer formulation (C) including a modified polyethylene; and the coating layer includes a polyurethane; wherein the multilayer film is a bi-directionally oriented film, and the orientation in both directions is introduced in the solid state. Such multilayer film exhibits reduced oxygen transmission rates and/or water vapour transmission rates.

20 Claims, No Drawings

COATED BI-DIRECTIONALLY ORIENTED MULTILAYER FILM

CROSS REFERENCE TO RELATED APPLICATIONS

This application is a National Stage application of PCT/EP2022/058803 filed Apr. 1, 2022, which claims the benefit of European Application No. 21167144.1, filed Apr. 7, 2021, both of which are incorporated by reference in their entirety herein.

BACKGROUND

The present invention relates to a coated bi-directionally oriented multilayer film comprising an ethylene-based polymer. The invention also relates to a process for the production of such film. The invention further relates to the use of such film in packaging applications such as food packaging applications. In particular, the invention relates to films that require certain low oxygen and/or water vapour transmission properties.

In the packaging industry, an increasingly important driver for decisions relating to the choice of materials for use in packaging is the ability to recycle or re-use the materials after a package has completed its use cycle. For materials to be particularly suitable for being recycled or re-used, it is beneficial that such packaging materials, as much as possible, are made out of ingredients that belong to the same family of materials. For example, when one considers polymer materials, which are ubiquitously used in packaging and which have a great array of very suitable and desirable properties for use in packaging, it is important that the polymer materials that are used in a single packaging element, such as a film, belong for the vast majority to the same family of polymers. In the example of films, in many cases such films are constructed having multiple distinct layers of materials, each present in such film the provide a specific set of features that are required for the particular packaging purpose.

Now, when one desires to optimise recyclability of such polymer films as used in packaging, one will encounter difficulties if film layers of very different materials are used. For example, combining layers of polyesters with layers of polyolefin materials may result in a waste product that is difficult to recycle into a high-value product once again.

Contrary to that, when films are made of multiple layers each comprising materials belonging to the same family of polymers, such as films containing as polymer ingredients only polyolefins, or better even only polyethylenes or polypropylenes, such films may provide fair or high quality material for recycling into a new valuable product—be it in packaging, or in an alternative application.

SUMMARY

Accordingly, it is desirable to construct films for packaging out of layers each comprising polymers of the same family. A particular film concept that allows for such is the bi-directional oriented polyethylene film. By inducing the particular orientation, such films have particularly desirable mechanical properties, and as they consist for the vast majority of polyethylenes as constituting materials, they can be readily recycled.

A further advantage of the bi-directional oriented polyethylene film concept is that at relatively low film thickness—and thus relatively low weight—much desired properties occur. Accordingly, such film concept not only contributes to recyclability, but also contributes to reduction of material consumption for a particular packaging purpose in the first place.

The above clearly presents advantages associated with bi-directionally oriented films, also herein further referred to as BOPE films. Having established these advantages, a need remains for further improvement of the properties of these films, to further expand its field of application. Particular properties that are paramount in that regard are permeability properties, in particular oxygen permeability and water vapour permeability. For certain purposes, it is desired that the oxygen permeability and/or the water vapour permeability of BOPE films are particularly low.

In the context of the present invention, this is now provided by the current inventors by a multilayer film comprising:
- an inner layer system comprising a first surface and a second surface;
- a first layer bound to the inner layer system at the first surface of the inner layer system; and
- a second layer comprising a first surface and a second surface, wherein the second layer is with its first surface bound to the inner layer system at the second surface of the inner layer system;
- a coating layer bound to the second layer at the second surface of the second layer;
wherein
the inner layer system consists of a polymer formulation (A) comprising ≥10.0 and ≤90.0 wt % of a linear low-density polyethylene (LLDPE-A) and ≥10.0 and ≤90.0 wt % of a high-density polyethylene (HDPE) having a density of ≥940 and ≤970 kg/m$^3$, preferably of ≥955 and ≤970 kg/m$^3$, as determined in accordance with ASTM D792 (2008);
the first layer consists of a polymer formulation (B) comprising a linear low-density polyethylene, preferably being the LLDPE-A, preferably wherein (B) comprises ≥ 80.0 wt % of the LLDPE-A
the second layer consists of a polymer formulation (C) comprising or consisting of a modified polyethylene, preferably comprising LLDPE-A and modified LLDPE-A; and
the coating layer comprises or consists of a polyurethane;
wherein the multilayer film is a bi-directionally oriented film wherein the orientation in both directions is introduced in the solid state.

Such multilayer film demonstrates a reduced oxygen transmission rate and/or a reduced water vapour transmission rate, whilst not compromising the desirably good mechanical properties of the BOPE films.

DETAILED DESCRIPTION

The modified polyethylene may for example be a polyethylene comprising moieties derived from maleic acid, fumaric acid, itaconic acid, acrylic acid, methacrylic acid, crotonic acid, methacrylic anhydride, maleic anhydride, or itaconic anhydride, preferably from maleic anhydride. The modified polyethylene may for example comprise ≥ 0.5 and ≤ 5.0 wt % of moieties derived from maleic acid, fumaric acid, itaconic acid, acrylic acid, methacrylic acid, crotonic acid, methacrylic anhydride, maleic anhydride, or itaconic anhydride, preferably ≥ 1.0 and ≤ 2.5 wt %, with regard to the total weight of the polyethylene. Preferably, the modified polyethylene comprises ≥ 0.5 and ≤ 5.0 wt % of moieties derived from maleic anhydride, preferably ≥ 1.0 and ≤ 2.5 wt %, with regard to the total weight of the polyethylene. The polymer composition (C) may for example be a composition comprising ≥ 0.1 and ≤ 1.0 wt % of moieties derived from maleic anhydride, preferably ≥0.1 and ≤ 0.5 wt %, with regard to the total weight of the modified polyethylene.

In a preferred embodiment, the LLDPE-A has a density of ≥ 918 and <940 kg/m$^3$, preferably of ≥ 918 and <930 kg/m$^3$, more preferably of ≥ 918 and <925 kg/m$^3$, as determined in accordance with ASTM D792 (2008).

In a preferred embodiment, the LLDPE-A has a melt mass-flow rate of ≥ 0.5 and ≤ 5.0 g/10 min, as determined in accordance with ASTM D1238 (2013) at a temperature of 190° C. under a load of 2.16 kg, preferably of ≥ 0.5 and ≤ 3.0 g/10 min, more preferably of ≥ 1.0 and ≤ 2.5 g/10 min.

In a preferred embodiment, the LLDPE-A has a fraction that is eluted in analytical temperature rising elution fractionation (a-TREF) at a temperature ≤30.0° C. of ≥ 3.0 wt %, with regard to the total weight of the LLDPE-A, preferably of ≥ 3.0 and ≤ 20.0 wt %, more preferably of ≥ 5.0 and ≤ 15.0 wt %.

In a preferred embodiment, the LLDPE-A has a fraction eluted in a-TREF at a temperature >94.0° C. of ≥20.0 wt %, with regard to the total weight of the LLDPE-A, preferably of ≥ 20.0 and ≤ 50.0 wt %, more preferably of ≥ 30.0 and ≤ 45.0 wt %.

In a preferred embodiment, the LLDPE-A has:
- a density of ≥918 and <940 kg/m$^3$ as determined in accordance with ASTM D792 (2008);
- a melt mass-flow rate of ≥ 0.5 and ≤ 5.0 g/10 min, as determined in accordance with ASTM D1238 (2013) at a temperature of 190° C. under a load of 2.16 kg;
- a fraction that is eluted in analytical temperature rising elution fractionation (a-TREF) at a temperature ≤30.0° C. of ≥ 3.0 wt %, with regard to the total weight of the LLDPE-A; and/or
- a fraction eluted in a-TREF at a temperature >94.0° C. of ≥ 20.0 wt %, with regard to the total weight of the LLDPE-A.

According to the invention, analytical temperature rising elution fractionation, also referred to as a-TREF, may be carried out using a Polymer Char Crystaf-TREF 300 equipped with stainless steel columns having a length of 15 cm and an internal diameter of 7.8 mm, with a solution containing 4 mg/ml of sample prepared in 1,2-dichlorobenzene stabilised with 1 g/l Topanol CA (1,1,3-tri(3-tert-butyl-4-hydroxy-6-methylphenyl)butane) and 1 g/l Irgafos 168 (tri(2,4-di-tert-butylphenyl) phosphite) at a temperature of 150° C. for 1 hour. The solution may be further stabilised for 45 minutes at 95° C. under continuous stirring at 200 rpm before analyses. For analyses, the solution was crystallised from 95° C. to 30° C. using a cooling rate of 0.1° C./min. Elution may be performed with a heating rate of 1° C./min from 30° C. to 140° C. The set-up may be cleaned at 150° C. The sample injection volume may be 300 µl, and the pump flow rate during elution 0.5 m$^1$/min. The volume between the column and the detector may be 313 µl. The fraction that is eluted at a temperature of ≤30.0° C. may in the context of the present invention be calculated by subtracting the sum of the fraction eluted ≥30.0° C. from 100%, thus the total of the fraction eluted ≤30.0° C., and the fraction eluted >30.0° C. to add up to 100.0 wt %.

Particularly, a-TREF may be carried out using a Polymer Char Crystaf-TREF 300 using a solution containing 4 mg/ml of the polymer in 1,2-dichlorobenzene, wherein the solution is stabilised with 1 g/l 1,1,3-tri(3-tert-butyl-4-hydroxy-6-methylphenyl)butane) and 1 g/l tri(2,4-di-tert-butylphenyl) phosphite) at a temperature of 150° C. for 1 hour, and further stabilised for 45 minutes at 95° C. under continuous stirring at 200 rpm, wherein the prior to analyses the solution is crystallised from 95° C. to 30° C. using a cooling rate of 0.1° C./min, and elution is performed at a heating rate of 1° C./min from 30° ° C. to 140° C., and wherein the equipment has been cleaned at 150° C.

The fraction that is eluted at a temperature of ≤30° C. may in the context of the present invention be calculated by subtracting the sum of the fraction eluted >94° C. and the fraction eluted >30° C. and ≤ 94° C. from 100%, thus the total of the fraction eluted ≤30° C., the fraction eluted >30° C. and ≤ 94° C. and the fraction eluted >94° C. to add up to 100.0 wt %.

In a particularly preferred embodiment of the invention, the modified polyethylene is a modified LLDPE-A. The polymer formulation (C) may for example comprise LLDPE-A and ≥ 5.0 and ≤ 25.0 wt % of a modified LLDPE-A, with regard to the total weight of the polymer formulation (C), preferably wherein the polymer formulation (C) comprises ≥75.0 and ≤ 95.0 wt % of LLDPE-A. Preferably, the polymer formulation (C) comprises ≥75.0 and ≤ 95.0 wt % of LLDPE-A, and ≥ 5.0 and ≤ 25.0 wt % of a modified LLDPE-A, wherein the modified LLDPE-A comprises ≥ 0.5 and ≤ 5.0 wt %, more preferably ≥ 1.0 and ≤ 2.5 wt %, of moieties derived from maleic anhydride, with regard to the total weight of the modified LLDPE-A.

LLDPE-A may for example be a copolymer of ethylene and an α-olefin comonomer selected from 1-butene, 1-hexene and 1-octene, preferably wherein LLDPE-A comprises ≥ 5.0 and ≤ 25.0 wt %, more preferably ≥ 5.0 and ≤ 15.0 wt %, of moieties derived from the α-olefin. For example, LLDPE-A may be a copolymer of ethylene and 1-hexene, preferably wherein LLDPE-A comprises ≥ 5.0 and ≤ 25.0 wt %, more preferably ≥ 5.0 and ≤ 15.0 wt %, of moieties derived from 1-hexene.

The LLDPE-A may for example have a molecular weight distribution as expressed by $M_w/M_n$ of ≥ 4.0 and ≤ 10.0, preferably of ≥ 5.0 and ≤ 7.5, wherein $M_w$ and $M_n$ each are determined in accordance with ASTM D6474 (2012).

The HDPE may be a homopolymer of ethylene or a copolymer of ethylene and an an α-olefin comonomer selected from 1-butene, 1-hexene and 1-octene, for example wherein the HDPE comprises ≥ 0.5 and ≤ 5.0 wt %, or ≥ 0.5 and ≤ 1.5 wt %, of moieties derived from the α-olefin. It is particularly preferred that the high-density polyethylene is a homopolymer of ethylene. The HDPE preferably has a density of ≥955 and ≤ 970 kg/m$^3$. The HDPE may for example have a molecular weight distribution as expressed by $M_w/M_n$ of ≥ 5.0 and ≤ 15.0, preferably of ≥ 6.0 and ≤ 12.5.

In the multilayer film according to the invention, the inner layer system may for example consist of a single layer, or may consist of 3, 5 or 7 layers. The multilayer film may for example have a thickness of ≥ 5 µm and ≤ 200 µm, preferably ≥10 µm and ≤ 75 µm. The coating layer may for example have a thickness of ≥ 25 and ≤ 500 nm, preferably of ≥ 25 and ≤ 250 nm, more preferably of ≥ 100 and ≤ 250 nm.

In a certain embodiment, the inner layer system consists of a polymer formulation (A) comprising ≥60.0 and ≤ 90.0 wt % of the LLDPE-A and ≥ 10.0 and ≤ 40.0 wt % of the HDPE, preferably comprising ≥ 60.0 and ≤ 80.0 wt % of the LLDPE-A and ≥ 20.0 and ≤ 40.0 wt % of the HDPE. In yet another embodiment, the inner layer system consists of a polymer formulation (A) comprising ≥ 10.0 and ≤ 40.0 wt % of the LLDPE-A and ≥60.0 and ≤ 90.0 wt % of the HDPE, preferably comprising ≥ 20.0 and ≤ 40.0 wt % of the LLDPE-A and ≥ 60.0 and ≤ 80.0 wt % of the HDPE.

In certain embodiments, the present invention also relates to a process for production of the multilayer film according to the invention, wherein the process involves the steps in this order of:
(a) manufacturing an unoriented multilayer film via cast extrusion, the unoriented film comprising
  an inner layer system comprising a first surface and a second surface;
  a first layer bound to the inner layer system at the first surface of the inner layer system; and
  a second layer comprising a first surface and a second surface, wherein the second layer is with its first surface bound to the inner layer system at the second surface of the inner layer system;
wherein
  the inner layer system consists of a polymer formulation (A) comprising ≥ 10.0 and ≤ 90.0 wt % of a first ethylene-based polymer being a linear low-density polyethylene (LLDPE-A) and ≥ 10.0 and ≤ 90.0 wt % of a high-density polyethylene (HDPE) having a density of ≥ 940 and ≤ 970 kg/m³, preferably of ≥ 955 and ≤ 970 kg/m³, as determined in accordance with ASTM D792 (2008);
  the first layer consists of a polymer formulation (B) comprising a linear low-density polyethylene, preferably being the LLDPE-A, preferably wherein (B) comprises ≥ 80.0 wt % of the LLDPE-A
  the second layer consists of a polymer formulation (C) comprising or consisting of a modified polyethylene, preferably comprising LLDPE-A and modified LLDPE-A;
(b) subjecting the unoriented film to heat to bring the film to a temperature of >70° C. and <$T_{pm}$ of the LLDPE-a, $T_{pm}$ being determined as peak melting temperature in accordance with ASTM D3418 (2008);
(c) stretching the heated cast film applying a stretching force in the machine direction (MD) to induce a drawing in the machine direction;
(d) applying a liquid dispersion comprising a polyurethane onto the second surface of the second layer;
(e) thermally drying the applied liquid dispersion to obtain a coating layer
(f) subjecting the obtained film to heat to bring the film to a temperature of between $T_{pm}$-25° C. and $T_{pm}$ of the LLDPE-A, under application of a stretching force in the transverse direction (TD) to induce a drawing in the transverse direction;
(g) maintaining the stretching forces and temperature to ensure drawing in TD is maintained to a level of >85% of the drawing in TD as applied; and
(h) cooling the stretched film to obtain a bi-directionally oriented film.

It is preferred that the degree of drawing in each of the MD and TD direction is at least 4.5, wherein the degree of drawing is the ratio between the dimension in the corresponding direction before and after the film is subjected to the orientation step in that particular direction.

The liquid dispersion as applied in the coating step (d) preferably is an aqueous dispersion. It is preferred that the liquid dispersion comprises ≥ 5.0 and ≤ 25.0 wt %, preferably ≥ 10.0 and ≤ 25.0 wt %, more preferably ≥ 10.0 and ≤ 20.0 wt %, of the polyurethane, with regard to the total weight of the liquid dispersion. Preferably, the liquid dispersion comprises ≥ 0.1 and ≤ 3.0 wt % of a crosslinking agent, preferably wherein the crosslinking agent is a polyfunctional aziridine. Preferably, the liquid dispersion comprises ≥ 0.1 and ≤ 3.0 wt % of silica nanoparticles, particularly preferably wherein the silica nanoparticles have an average particle size of 50-200 nm, preferably of 50-150 nm, and more particularly preferably wherein the silica nanoparticles have a BET surface of 10-100 m²/g, preferably of 20-80 m²/g. The BET surface may be determined in accordance with the method of ISO 9277-2010. The average particle size may be determined in accordance with the method of ISO 13320-2009.

It is preferred that the liquid dispersion is applied in step (d) in a quantity of ≥ 3.0 and ≤ 20.0 g/m² of the film, preferably of ≥ 5.0 and ≤ 15.0 g/m².

The invention in an embodiment also relates to a package comprising the multilayer film, preferably wherein the package contains foodstuff products.

Onto the coated surface, a metal layer, an aluminium layer or a silicon dioxide layer may be further applied. Such further layer may additionally contribute to the reduction of the oxygen transmission rate and/or the water vapour transmission rate.

In a certain embodiment, the film may have a tensile modulus in the MD direction of >500 MPa, and/or a shrinkage in the MD direction of <3.0%. In certain embodiments, the first skin layer may comprise a plastomer, preferably an ethylene-1-octene copolymer having a density of ≥ 885 and ≤ 915 kg/m³.

In the context of the present invention, it is to be understood that a bi-directionally oriented film wherein the orientation in both directions is introduced in the solid state is not a blown film. In a blow film, the orientation is introduced in molten state. It is preferred that the orientation of the film of the present invention is performed at a temperature of at least 10° C. below the melting temperature of the film.

The invention will now be illustrated by the following non-limiting examples.

| Polyethylene materials | |
|---|---|
| LLDPE-A | SABIC LLDPE BX202, a linear low-density polyethylene |
| HDPE | SABIC F04660, a high density polyethylene |

In the table below, key properties of the polyethylene materials are presented.

| Material | HDPE | LLDPE-A |
|---|---|---|
| MFR2 | 0.7 | 2.1 |
| Density | 961 | 921 |
| $T_{pm}$ | 134 | 124 |
| $T_c$ | 118 | 111 |
| Ethylene units content | 100.0 | 89.0 |
| Comonomer units content | 0.0 | 11.0 |
| Comonomer type | — | C6 |
| $M_n$ | 9 | 18 |
| $M_w$ | 105 | 115 |
| $M_z$ | 670 | 450 |
| $M_w/M_n$ | 11.3 | 6.3 |
| $M_z/M_w$ | 6.3 | 3.9 |
| $M_z/M_n$ | 74 | 25.0 |
| a-TREF <30 | 0.0 | 13.5 |
| a-TREF 30-94 | 0.0 | 50.9 |
| a-TREF >94 | 100.0 | 35.6 |

Wherein
  the MFR2 is the melt mass flow rate as determined in accordance with ASTM D1238 (2013) at a temperature of 190° C. under a load of 2.16 kg, expressed in g/10 min;

the density is determined in accordance with ASTM D792 (2008), expressed in kg/m³;

$T_{pm}$ is the peak melting temperature as determined using differential scanning calorimetry (DSC) in accordance with ASTM D3418 (2008), expressed in ° C.;

$T_c$ is the crystallisation temperature as determined using differential scanning calorimetry (DSC) in accordance with ASTM D3418 (2008), expressed in ° C.;

the amount and type of comonomer is determined using $^{13}$C Nuclear Magnetic Resonance on a Bruker Avance 500 spectrometer equipped with a cryogenically cooled probe head operating at 125° C., whereby the samples are dissolved at 130° C. in $C_2D_2Cl_4$ containing DBPC as stabiliser.

the ethylene units content indicates the weight quantity of units present in the polymer that are derived from ethylene, also referred to as the quantity of moieties derived from ethylene, with regard to the total weight of the polymer, expressed in weight %;

the comonomer content indicates the weight quantity of units present in the polymer that are derived from the comonomer, also referred to as the quantity of moieties derived from the comonomer, with regard to the total weight of the polymer, expressed in wt %;

the comonomer type indicates the type of comonomer used in the production of the polymer, where C6 is 1-hexene;

$M_n$ is the number average molecular weight, $M_w$ is the weight average molecular weight, and $M_z$ is the z-average molecular weight, wherein $M_n$, $M_w$, and $M_z$ and determined in accordance with ASTM D6474 (2012);

a-TREF <30 indicates the fraction of the polymer that is eluted in a-TREF according to the method presented above in the temperature range ≤30.0° ° C., expressed in wt %, and represents the amorphous fraction of the polymer, calculated by subtracting the a-TREF 30-94 and the a-TREF >94 fraction from 100.0 wt %;

a-TREF 30-94 indicates the fraction of the polymer that is eluted in a-TREF in the temperature range of >30.0 and ≤ 94.0° C., expressed in wt %, and represents the branched fraction of the polymer;

a-TREF >94 indicates the fraction of the polymer that is eluted in a-TREF in the temperature range of >94.0 and <140° C., expressed in wt %, and represents the linear fraction of the polymer.

The a-TREF analyses were be carried out using a Polymer Char Crystaf-TREF 300 with a solution containing 4 mg/ml of sample prepared in 1,2-dichlorobenzene stabilised with 1 g/l Topanol CA (1,1,3-tri(3-tert-butyl-4-hydroxy-6-methylphenyl)butane) and 1 g/l Irgafos 168 (tri(2,4-di-tert-butylphenyl) phosphite) at a temperature of 150° C. for 1 hour. The solution was stabilised for 45 minutes at 95° C. under continuous stirring at 200 rpm before analyses. For analyses, the solution was crystallised from 95° C. to 30° C. using a cooling rate of 0.1° C./min. Elution was performed with a heating rate of 1° C./min from 30° C. to 140° C. The set-up was cleaned at 150° C.

Preparation of Modified Polyethylene (PE-g-MAH)

PE-g-MAH is produced using a twin screw extruder with a screw diameter of 27 mm. A quantity of LLDPE-A was fed to the twin screw extruder under a nitrogen atmosphere. A quantity of polar monomer composition was dosed via 57 wt % solution of maleic anhydride in acetone. After that the free radical initiator composition was dosed as 5 wt % solution of cumyl hydroperoxide in acetone. The polar monomer and the free radical initiator were dosed to the extruder in the melt zone. The polyethylene (LLDPE-A), polar monomer composition and the free radical initiator were melt mixed in the extruder which was set at a temperature of 290° C. The twin screw extruder was operated at a screw speed of 650 rpm and fed with such quantities of polyethylene, polar monomer and free radical initiator to ensure a total throughput of 22 kg/h.

The quantity of free radical initiator was 0.13 weight % of the pure peroxide fed to the extruder compared to the weight of the polyethylene fed to the extruder, multiplied by 100%.

The quantity of polar monomer was 2.5 weight % of the pure monomer fed to the extruder compared to the weight of the polyethylene fed to the extruder, multiplied by 100%.

The free radical initiator was a commercially available peroxide having the chemical name cumyl hydroperoxide and CAS registry number 80-15-9, having a half-life time at 260 C of 5.9 seconds.

The polar monomer was a commercially available monomer having the chemical name maleic anhydride (MAH) and CAS registry number 108-31-6.

The amount of grafted MAH is measured according to the FTIR and titration method described in M. Sclavons et al, Polymer 41 (2000) 1989-1999.

The obtained PE-g-MAH contained 1.9 wt % of maleic anhydride and an MFR2 of 4.0 g/10 min.

Using the obtained PE-g-MAH, the polymer composition C (PE-C) was produced via compounding a composition of 15 wt % of the PE-g-MAH and 85 wt % of the LLDPE-A using a twin-screw extruder at a temperature of 235° C. and a screw speed of 200 rpm. The PE-C so obtained contained 0.3 wt % maleic anhydride, with regard to the total weight of the PE-C, and had an MFR2 of 2.1 g/10 min.

| Coating dispersion formulations | |
|---|---|
| PU | 48.0 wt % Takelac WPB341, obtainable from Mitsui Chemical comprising 30% polyurethane dispersed in water; 1.2 wt % Levasil 30/50, obtainable from AkzoNobel, comprising 50 wt % $SiO_2$ nanoparticles dispersed in water; and 50.8 wt % water |

Manufacturing of Films

Multilayer biaxially oriented films with the structures shown in the table below were produced using a three-layer cast film line in combination with a tenter frame and an in-line coating unit positioned between the machine direction drawing unit and the transverse direction drawing unit. The total throughput is around 140 kg/h and the extrusion temperatures are 250° C. Three-layer films were obtained comprising a first layer (layer A), an inner layer (layer B) and a second layer (layer C). The three-layer cast film is cooled on the chill roll to a temperature between 40 and 55° C. After cooling, the cast film is stretched into the machine direction using a set of rolls for preheating (90-110° C.), drawing to a draw ratio of 5.5 (at 90-105° C.) followed by an annealing step at 92° C.

After drawing into the machine direction, the films of example 1 was coated using a Brückner reverse gravure in-line coating unit, installed between the machine direction drawing unit and the transverse direction drawing unit. The temperature was below 100° C.

The film was drawn into the transverse direction with a draw ratio of 7 at an oven temperature ranging from 160° C. at the beginning of the oven to 90° C. at the end of the drawing oven. A corona treatment was performed on the layer C for the uncoated comparative examples 2 and 3. A biaxially oriented multilayer film with a thickness of 25 μm was obtained. The thickness of the coating layer was ca. 150 nm.

| Example | Layer | Material composition | Layer weight |
|---|---|---|---|
| 1 + 3 | A | 91.0% LLDPE-A, 4.0% AB, 5.0 wt % SL | 10.0 |
|  | B | 35.0% LLDPE-A, 65.0% HDPE | 80.0 |
|  | C | 100% PE-C | 10.0 |
| 2 | A | 91.0% LLDPE-A, 4.0% AB, 5.0 wt % SL | 10.0 |
|  | B | 65.0% LLDPE-A, 35.0% HDPE | 80.0 |
|  | C | 100% PE-C | 10.0 |

In example 1, a PU coating was applied.

Of the thus obtained films, a set of properties were determined as indicated in the table below.

|  | Example | | |
|---|---|---|---|
|  | 1 | 2 | 3 |
| Thickness, μm | 26.5 | 24.7 | 24.3 |
| Haze | 15.5 | 13.0 | 10.8 |
| Tensile modulus—MD | 969 | 565 | 1008 |
| Tensile modulus—TD | 1099 | 631 | 1153 |
| Tensile strength—MD | 100 | 89 | 112 |
| Tensile strength—TD | 74 | 58 | 83 |
| Elongation at break—MD | 188 | 195 | 173 |
| Oxygen transmission rate | 365 | 7909 | 4371 |
| Water vapour transmission rate | 11.2 | 17.5 | 10.0 |
| Shrinkage at 100° C.—MD | 1.2 | 1.4 | 2.4 |
| Shrinkage at 100° C.—TD | 0.7 | 1.8 | 2.0 |

Wherein:
  Haze is determined in accordance with ASTM D1003 (2013), expressed in %;
  Tensile modulus is determined in the machine direction (MD) and transverse direction (TD) of the film, expressed in MPa, determined as 1% secant modulus in accordance with ASTM D882-18, using an initial sample length of 250 mm and a testing speed of 25 mm/min, at room temperature, using preload of 1 N;
  Tensile strength at break is determined in accordance with ASTM D882-18, in both machine direction (MD) and in transverse direction (TD), expressed in MPa, determined at room temperature using an initial sample length of 50 mm and a testing speed of 500 mm/min;
  Elongation at break is determined in accordance with ASTM D882-18, in both machine direction (MD) and in transverse direction (TD), expressed in MPa, determined at room temperature using an initial sample length of 50 mm and a testing speed of 500 mm/min;
  Oxygen transmission rate is determined according ASTM D3985 (2010) at 23° C.-50% relative humidity and expressed in $cm^3/m^2 \cdot day \cdot bar$;
  Water vapour transmission rate is determined according ASTM F1249 (2013) at 38° C.-100% relative humidity and expressed in $g/m^2 \cdot day$;
  Shrinkage is determined in accordance with ISO 11501-1995, at a temperature of 100° C. for 5 minutes using a sample of 50×50 mm.

From the above, one can observe that the coated films according to the invention demonstrate a reduced oxygen transmission rate and/or a reduced water vapour transmission rate.

The invention claimed is:

1. A multilayer film comprising:
  an inner layer system comprising a first surface and a second surface;
  a first layer bound to the inner layer system at the first surface of the inner layer system; and
  a second layer comprising a first surface and a second surface, wherein the second layer is with its first surface bound to the inner layer system at the second surface of the inner layer system;
  a coating layer bound to the second layer at the second surface of the second layer;
  wherein
  the inner layer system consists of a polymer formulation (A) comprising ≥60.0 and ≤90.0 wt % of a linear low-density polyethylene (LLDPE-A) and ≥10.0 and ≤40.0 wt % of a high-density polyethylene (HDPE) having a density of ≥940 and ≤970 kg/m³, as determined in accordance with ASTM D792 (2008);
  the first layer consists of a polymer formulation (B) comprising a linear low-density polyethylene,
  the second layer consists of a polymer formulation (C) comprising or consisting of a modified polyethylene; and
  the coating layer comprises or consists of a polyurethane;
  wherein the multilayer film is a bi-directionally oriented film wherein the orientation in both directions is introduced in the solid state, and
  wherein the coating layer has a thickness of ≥25 and ≤500 nm.

2. A multilayer film comprising:
  an inner layer system comprising a first surface and a second surface;
  a first layer bound to the inner layer system at the first surface of the inner layer system; and
  a second layer comprising a first surface and a second surface, wherein the second layer is with its first surface bound to the inner layer system at the second surface of the inner layer system;
  a coating layer bound to the second layer at the second surface of the second layer;
  wherein
  the inner layer system consists of a polymer formulation (A) comprising ≥10.0 and ≤90.0 wt % of a linear low-density polyethylene (LLDPE-A) and ≥10.0 and ≤90.0 wt % of a high-density polyethylene (HDPE) having a density of ≥940 and ≤970 kg/m³, as determined in accordance with ASTM D792 (2008);
  the first layer consists of a polymer formulation (B) comprising a linear low-density polyethylene,
  the second layer consists of a polymer formulation (C) comprising or consisting of a modified polyethylene; and
  the coating layer comprises or consists of a polyurethane;
  wherein the multilayer film is a bi-directionally oriented film wherein the orientation in both directions is introduced in the solid state, and
  wherein the LLDPE-A has:
  a fraction that is eluted in analytical temperature rising elution fractionation (a-TREF) at a temperature ≤30.0° C. of ≥3.0 wt %, with regard to the total weight of the LLDPE-A.

3. The multilayer film according to claim 1, wherein the polymer formulation (C) comprises LLDPE-A and ≥5.0 and ≤25.0 wt % of a modified LLDPE-A, with regard to the total weight of the polymer formulation (C).

4. The multilayer film according to claim 1, wherein the modified polyethylene is a polyethylene comprising moieties derived from maleic acid, fumaric acid, itaconic acid, acrylic acid, methacrylic acid, crotonic acid, methacrylic anhydride, maleic anhydride, or itaconic anhydride.

5. The multilayer film according to claim 1, wherein the modified polyethylene is a composition comprising a polyethylene comprising ≥0.5 and ≤5.0 wt % of moieties derived from maleic anhydride, with regard to the total weight of the polyethylene.

6. The multilayer film according to claim 5, wherein the modified polyethylene is a modified LLDPE-A.

7. The multilayer film according to claim 1, wherein the high-density polyethylene is a homopolymer of ethylene.

8. The multilayer film according to claim 1, wherein the inner layer system consists of a single layer, or wherein the inner layer system consists of 3, 5 or 7 layers.

9. The multilayer film according to claim 1, wherein the film has a thickness of ≥5 µm and ≤200 µm.

10. A process for production of the multilayer film according to claim 1, wherein the process comprises the steps in this order of:
(a) manufacturing an unoriented multilayer film via cast extrusion, the unoriented film comprising
an inner layer system comprising a first surface and a second surface;
a first layer bound to the inner layer system at the first surface of the inner layer system; and
a second layer comprising a first surface and a second surface, wherein the second layer is with its first surface bound to the inner layer system at the second surface of the inner layer system;
wherein
the inner layer system consists of a polymer formulation (A) comprising ≥60.0 and ≤90.0 wt % of a first ethylene-based polymer being a linear low-density polyethylene (LLDPE-A) and ≥10.0 and ≤40.0 wt % of a high-density polyethylene (HDPE) having a density of ≥940 and ≤970 kg/m³, as determined in accordance with ASTM D792 (2008);
the first layer consists of a polymer formulation (B) comprising a linear low-density polyethylene,
the second layer consists of a polymer formulation (C) comprising or consisting of a modified polyethylene;
(b) subjecting the unoriented film to heat to bring the film to a temperature of >70° C. and <$T_{pm}$ of the LLDPE-a, $T_{pm}$ being determined as peak melting temperature in accordance with ASTM D3418 (2008);
(c) stretching the heated cast film applying a stretching force in the machine direction (MD) to induce a drawing in the machine direction;
(d) applying a liquid dispersion comprising a polyurethane onto the second surface of the second layer;
(e) thermally drying the applied liquid dispersion to obtain a coating layer having a thickness of ≥25 and ≤500 nm;
(f) subjecting the obtained film to heat to bring the film to a temperature of between $T_{pm}$-25° C. and $T_{pm}$ of the LLDPE-A, under application of a stretching force in the transverse direction (TD) to induce a drawing in the transverse direction;
(g) maintaining the stretching forces and temperature to ensure drawing in TD is maintained to a level of >85% of the drawing in TD as applied; and
(h) cooling the stretched film to obtain a bi-directionally oriented film.

11. The process according to claim 10, wherein the degree of drawing in each of the MD and TD direction is at least 4.5, wherein the degree of drawing is the ratio between the dimension in the corresponding direction before and after the film is subjected to the orientation step in that particular direction.

12. The process according to claim 10, wherein the liquid dispersion is an aqueous dispersion.

13. The process according to claim 10, wherein the liquid dispersion comprises ≥5.0 and ≤25.0 wt % of the polyurethane, with regard to the total weight of the liquid dispersion.

14. The process according to claim 10, wherein the liquid dispersion is applied in step (d) in a quantity of ≥3.0 and ≤20.0 g/m² of the film.

15. A package comprising the multilayer film according to claim 1.

16. The multilayer film according to claim 2, wherein the LLDPE-A has a fraction that is eluted in a-TREF at a temperature ≤30.0° C. of ≥5.0 and ≤15.0 wt %, with regard to the total weight of the LLDPE-A.

17. A multilayer film comprising:
an inner layer system comprising a first surface and a second surface;
a first layer bound to the inner layer system at the first surface of the inner layer system; and
a second layer comprising a first surface and a second surface, wherein the second layer is with its first surface bound to the inner layer system at the second surface of the inner layer system;
a coating layer bound to the second layer at the second surface of the second layer;
wherein
the inner layer system consists of a polymer formulation (A) comprising ≥10.0 and ≤90.0 wt % of a linear low-density polyethylene (LLDPE-A) and ≥10.0 and ≤90.0 wt % of a high-density polyethylene (HDPE) having a density of ≥940 and ≤970 kg/m³, as determined in accordance with ASTM D792 (2008);
the first layer consists of a polymer formulation (B) comprising a linear low-density polyethylene,
the second layer consists of a polymer formulation (C) comprising or consisting of a modified polyethylene; and
the coating layer comprises or consists of a polyurethane;
wherein the multilayer film is a bi-directionally oriented film wherein the orientation in both directions is introduced in the solid state,
wherein the LLDPE-A has a fraction eluted in analytical temperature rising elution fractionation (a-TREF) at a temperature >94.0° C. of ≥20.0 wt %, with regard to the total weight of the LLDPE-A.

18. The multilayer film according to claim 17, wherein the LLDPE-A has a fraction eluted in a-TREF at a temperature >94.0° C. of ≥30.0 and ≤45.0 wt %, with regard to the total weight of the LLDPE-A.

19. The multilayer film according to claim 18, wherein the LLDPE-A has a fraction that is eluted in a-TREF at a temperature ≤30.0° C. of ≥3.0 wt %, with regard to the total weight of the LLDPE-A.

20. The multilayer film according to claim 18, wherein the LLDPE-A has a fraction that is eluted in a-TREF at a temperature ≤30.0° C. of ≥5.0 and ≤15.0 wt %, with regard to the total weight of the LLDPE-A.

* * * * *